May 12, 1931. T. C. ROUSE 1,804,645
HOLDER FOR MILK BOTTLES AND THE LIKE
Original Filed Dec. 3, 1928   3 Sheets-Sheet 1
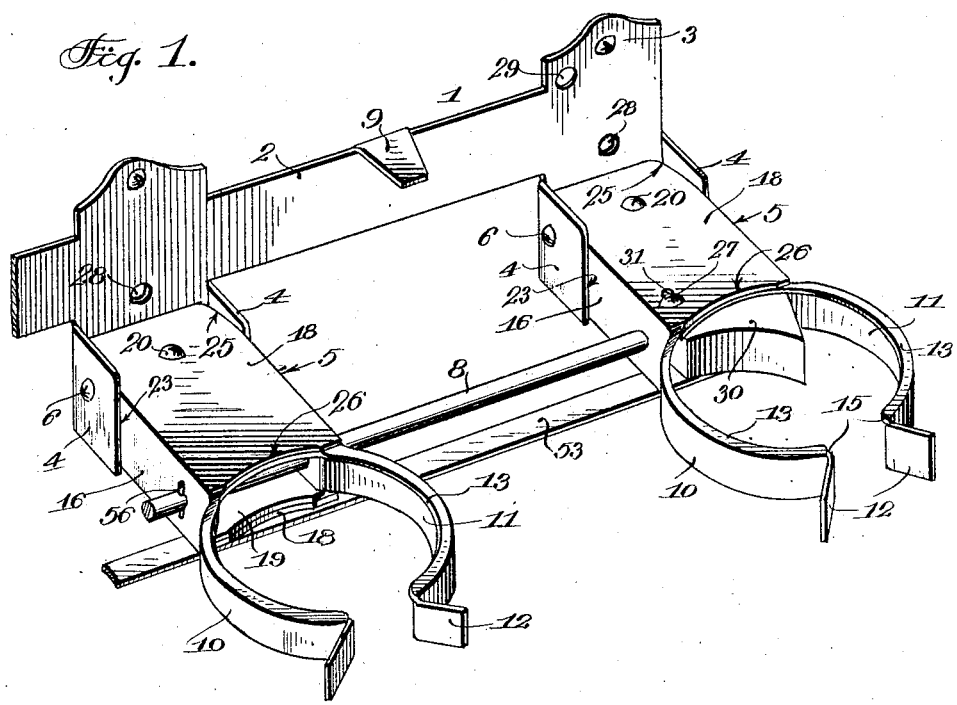
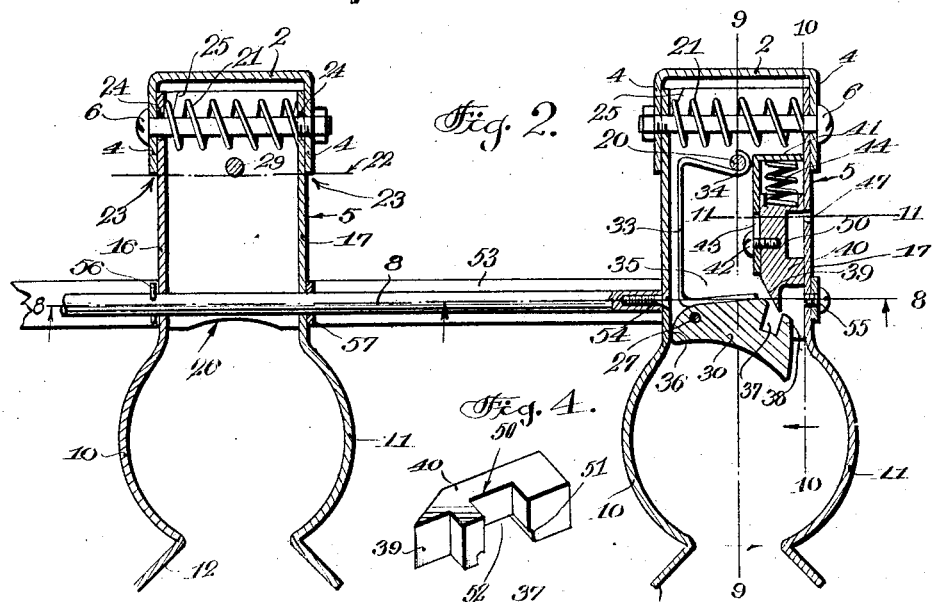
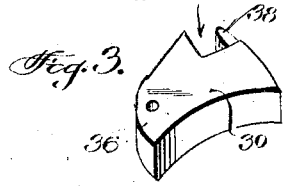
INVENTOR
Thomas C. Rouse
BY
ATTORNEY
WITNESSES May 12, 1931.     T. C. ROUSE     1,804,645
HOLDER FOR MILK BOTTLES AND THE LIKE
Original Filed Dec. 3, 1928    3 Sheets-Sheet 2
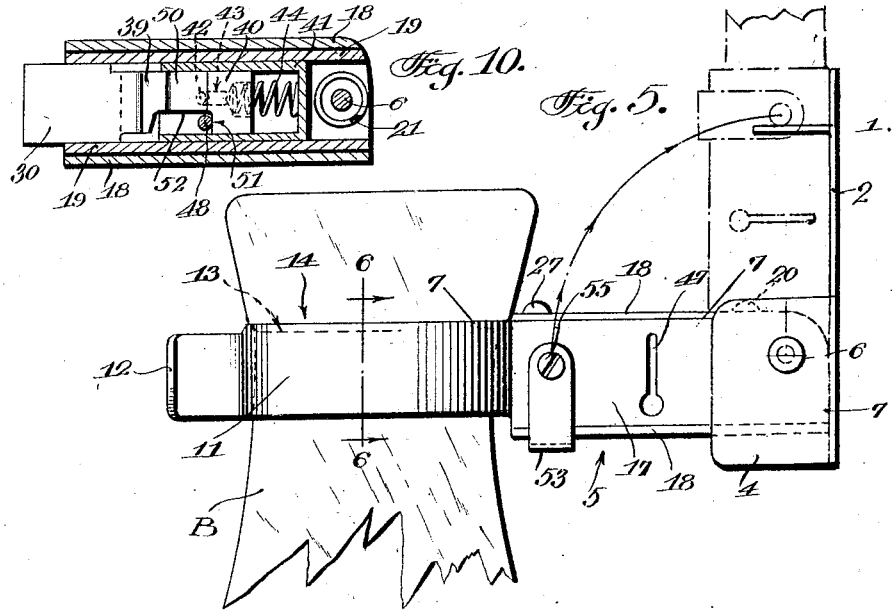
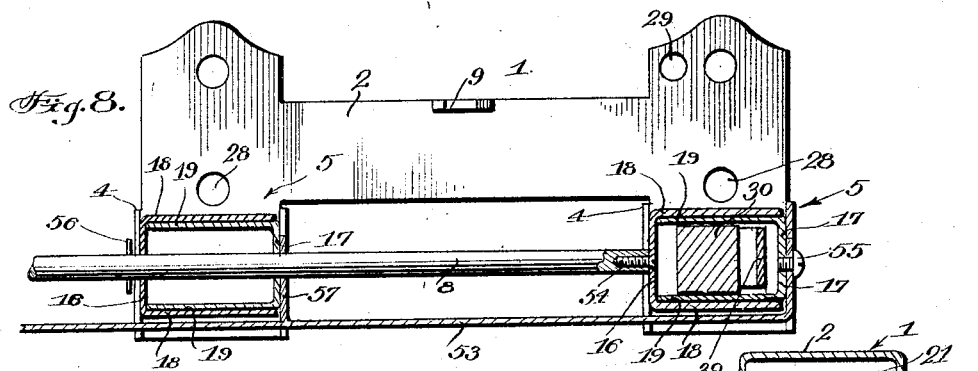
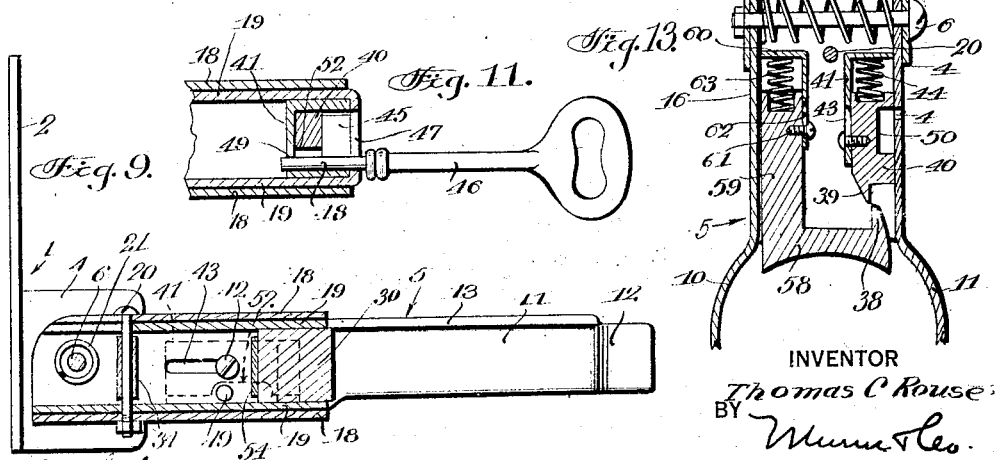
INVENTOR
Thomas C Rouse
BY
ATTORNEY

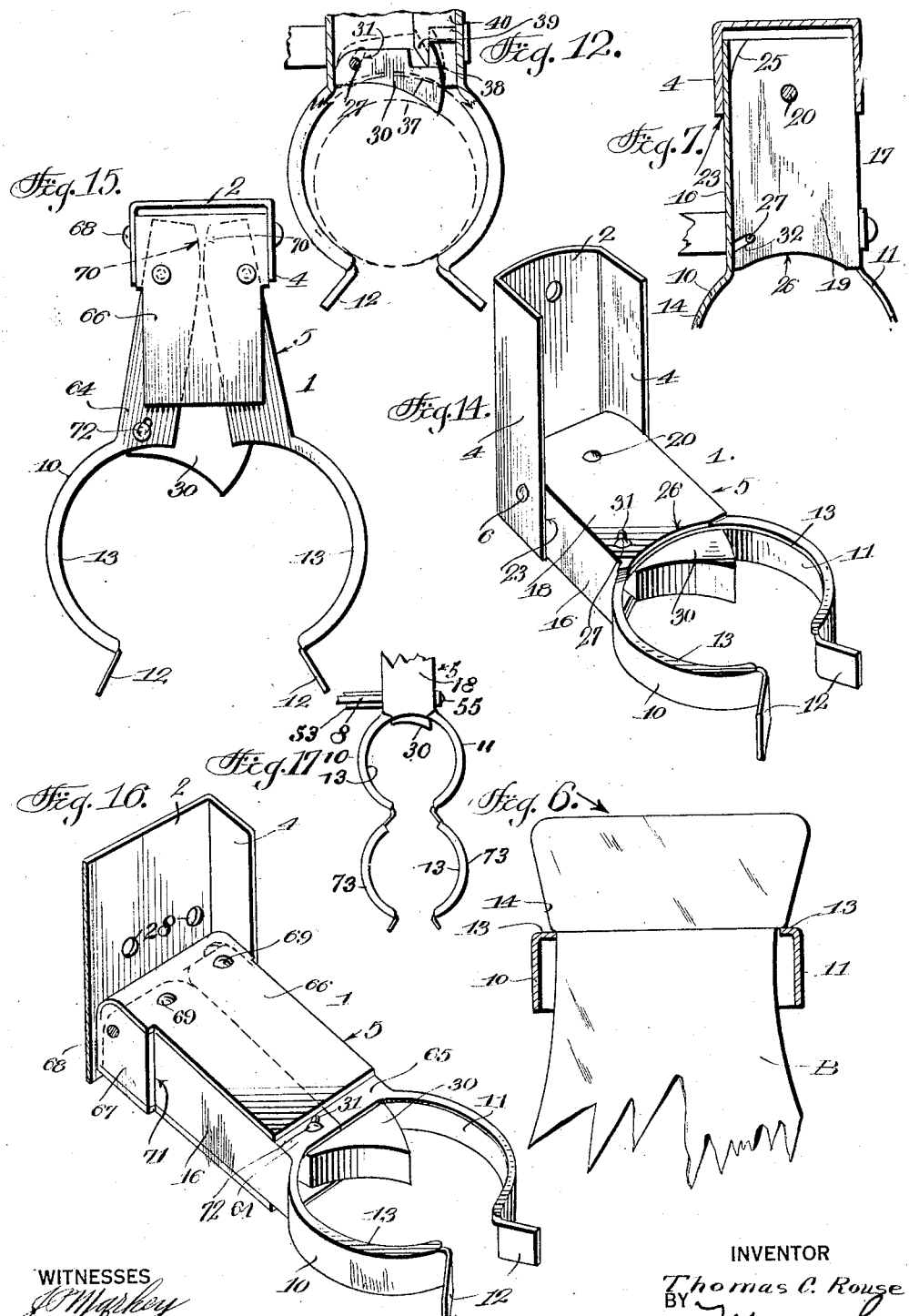

Patented May 12, 1931

1,804,645

UNITED STATES PATENT OFFICE

THOMAS C. ROUSE, OF WILMINGTON, DELAWARE

HOLDER FOR MILK BOTTLES AND THE LIKE

Application filed December 3, 1928, Serial No. 323,438. Renewed September 30, 1930.

This invention relates to improvements in holders, and it consists of the constructions, combinations and arrangements herein described and claimed.

An object of the invention is to provide a holder which, although especially adapted to secure milk bottles so that they can be removed by none other than an authorized person, can be put to the purpose of securing a more or less diversified assortment of things.

Another object of the invention is to employ that principle in a holder whereby the insertion of the last one of a series of objects (milk bottles, for example) will serve to hold all of the objects of the series in a locked position.

A further object of the invention is to provide a holder which includes a plurality of holding members, each of which is adapted to receive an object to be held, and one of which has a locking device which will automatically lock all of the objects of a series of objects when the last object of said series is inserted in said one holding member.

A further object of the invention is to provide a holder which has a locking device not only capable of automatically locking an object to be held, but also adaptable to a variety of sizes of objects, so that a relatively small object can be locked equally as well as a relatively large object.

Other objects and advantages appear in the following specification, reference being had to the accompanying drawings in which, Figure 1 is a perspective view of the improved holder, the arrangement being such that the holder is especially adapted for securing milk bottles, Figure 2 is a horizontal section of the holder, Figure 3 is a detail perspective view of the latch, Figure 4 is a detail perspective view of the bolt, Figure 5 is a side elevation of the holder, particularly illustrating the holding member which has the locking device incorporated therein, Figure 6 is a detail vertical section taken on the line 6—6 of Figure 5, the milk bottle being shown in elevation, Figure 7 is a detail horizontal section taken on the line 7—7 of Figure 5, Figure 8 is a section taken substantially on the line 8—8 of Figure 2, Figure 9 is a section taken on the line 9—9 of Figure 2, Figure 10 is a detail section taken on the line 10—10 of Figure 2, Figure 11 is a detail section taken on the line 11—11 of Figure 2, the key being shown in place, Figure 12 is a diagrammatic view illustrating the action of the locking device in one of the holding members, Figure 13 is a horizontal section of a holding member showing a modified form of the latch, Figure 14 is a perspective view in which the holder is reduced to but a single holding member in which the locking device is incorporated, Figure 15 is a plan view of the holder again reduced to but a single holding member but having a modified arrangement of the jaws, Figure 16 is a perspective view of the same formation of jaws in a holder which is intended to comprise a plurality of holding members, Figure 17 is a plan view of the holder, modified for the particular purpose of loosely holding empty milk bottles.

This invention is an improvement on the milk bottle holder disclosed in the patent to Thomas C. Rouse, No. 1,630,409 of May 31, 1927. The holder in the patent is primarily intended to serve the purpose of securing a single milk bottle, and while the improved holder is of that structural arrangement which will enable it to secure a plurality of milk bottles, yet it can be put to the additional purposes of securing a wide variety of objects other than milk bottles.

Although the description uses milk bottles as the example for the purpose of the holder, it must be understood that objects other than milk bottles can be held. For instance, the holder may be employed to secure automobile tires. The principle of construction is such that when it is properly incorporated in a holder it will serve to secure any number of milk bottles. But when a series of milk bottles is to be held, these must be so inserted in the various holding members that the holding member having the locking device will be filled last, so that the insertion of the last milk bottle in this particular holding member will serve to so actuate the locking device that all of the holding members will be automatically locked.

The locking device is particularly constructed so that it will function regardless of whether a small or large bottle is inserted in the holding member in which it is incorporated. It is generally the case that gill bottles have necks smaller than quart bottles. It might appear that the locking device if adjusted to hold a quart bottle would not hold a gill bottle, and vice versa, but as will presently appear, the structure of the locking device is such that it will hold not only two extreme sizes but any intermediate size as well.

Reference is made to the drawings. The holder is generally indicated 1 in each of the various forms of the inventon. In each case the holder includes a base plate 2 which is intended to be more or less permanently secured to a support as shown by the screws 3 in Figure 1. For instance, the base plate might be secured to the outside of a kitchen door. The milk man can insert the bottles in the holder in the early morning, affording the house wife the convenience of bringing the milk bottles into the kitchen by merely opening the door.

Side leaves 4 bent forwardly from the base plate 2 provide supports to which the holding members, generally designated 5, are pivoted as at 6. The pivots are herein shown as bolts, but in practice may consist of something other than bolts and would preferably be so arranged that they cannot be so tampered with as to permit the removal of the holding members from the base plate. It is to be observed in Figures 1 and 5 that the pivots 6 are disposed above the horizontal centers of the holding members. Thus, when the holding members are let down into the bottle-receiving position, in Figures 1 and 5, the nether portions of the holding members will serve as heels 7 (Figure 5) to abut the base plate and limit the downward movement.

When the holder is not in use the members 5 may be swung upon the pivots 6 until a connecting rod 8 catches upon a spring tongue 9 which is bent forwardly from the base plate 2. The parts 8 and 9 are in such relative positions that the rod 8 will slip on top of the tongue 9 and thus hold the members 5, although the same purpose would be served if the connecting rod 8 were to slip under the tongue. Any suitable construction of the tongue 9 may be adopted to perform the holding function.

Each of the holding members 5 is identical in construction to the extent that it comprises a left jaw 10 and a right jaw 11. The jaws are appropriately curved to receive the neck of a milk bottle, but if the holder were adapted to some other purpose it is probable that the shape of the jaws would be different. The free extremities of the jaws are turned outwardly at 12 to provide mouths through which the necks of milk bottles are thrust. When thrust in position the milk bottle necks will be directly contacted by the edges of flanges 13 formed on the upper edges of the jaws.

These flanges serve the very important purpose of making the holder lock perfectly. They will catch under the shoulder 14 of the milk bottle B (Fig. 6) in such a manner as to adequately support the milk bottle. The offset of the flanges is inwardly as shown, and by virtue of the provision thereof a milk bottle may be swiftly inserted between the jaws without any partcular regard as to angle, there being the assurance that the locking function will be performed. In addition to this, the flanges 13 impart the necessary strength to the jaws.

If the jaws were perfectly flat, that is to say without the flanges 13, the bottle would not be locked in place so freely. The upper edges of the jaws would then be depended upon to hold the bottle, but considering that the jaws are at least 5/8 inches in depth it will be perceived that the outward curvature of the bottle neck below the shoulder 14 might prevent the engagement of the upper edges with said shoulder. By bending in the top edges of the jaws to compose the flanges 13 there will be no question about the support of the bottle.

The respective jaws extend from side arms 16 and 17 which have plates 18 and 19. It is here that the common characteristics of the holding members end, for, although the holder in Figures 15 and 16 has plates, in one instance the plates overlap and in the other they do not. Again, only one of the holding member is equipped with a locking device while the other are not, and regardless of how many holding members 5 would be employed in a single holder 1, only one of the holding members is intended to be furnished with a locking device.

Reverting to the overlapping arrangement of the plates 18 and 19, it will be observed in Figure 8 that this is brought about by bending the side arms 17 at places closer together than corresponding places at which the side arms 16 are bent. The result is that one set of plates can be slipped inside of the other. The plates are pivoted together by pins 20 at points within the confines of the side leaves 4. The pivots are vertical when the holding members 5 are extended in the receiving position in Figures 1 and 5. The plates 18 and 19 are perfectly free to move in respect to each other as they must necessarily do when the milk bottle B is thrust into the mouths of the jaws. The plates 18 and 19 are of sufficient breadth to extend from side to side of the arms 16 and 17. In other words, the plates 18 extend approximately to the side arms 17, while the plates 19 extend approximately to the side arms 16.

This arrangement affords protection not only by virtue of the strength imparted by the double thicknesses of metal at the top and bottom, but also by excluding foreign matter from so much of the relatively movable areas that the accumulation of dust, dirt, water, etc., on the holder will not act as an impediment to the free operation thereof. Moreover, the contact of the left edges of the plates 19 of the jaws 11 with the side arms 16 of the jaws 10 limits the movement of the jaws toward each other under the influence of springs 21, so that the mouths of the jaws will always stand ready to receive a milk bottle.

It is upon the pivots 6 that the springs 21 are assembled. The springs have nothing to do with the pivots, but the pivot bolts do serve as effective retainers for the springs. The springs are housed within the side arms and plates, and the pressure of the springs is applied to the side arms 16 and 17 at points behind the pivot pins 20 so that the jaws 10 are normally urged toward each other until stopped by the engagement of the plates 19 with side arms 16. The inner ends of the holding members are rather closely housed between the side leaves 4, but this does not restrict the freedom of motion when a milk bottle is inserted, for the following reasons:—

It has been stated that the pivot pins 20 are within the confines of the leaves. But these pivot pins stand very close to the forward edges of the leaves as will be seen by comparing the position of the left pivot pin 20 in Figure 2 with the line 22 struck across the outer edges of the leaves. This relative disposition of the parts enables the points of contact of the side arms 16 and 17 with the forward edges of the leaves 4 to act as fulcrums as indicated at 23. In thrusting a milk bottle neck in the mouth of a pair of jaws the side arms 16 and 17 will be seen to rock upon the fulcrums 23.

The pivot pin 20 will move forwardly a slight distance. This does not require a loose connection of the pin 20 with the plates 18, 19 as might be supposed, but on the contrary the connection of the pin 20 with these plates is rather tight. However, the holes 24 in the side arms 16 and 17 through which the pivots 6 pass are amply large to compensate for the arcuate motion resulting from the swinging of the side arms on the fulcrums 23.

Those edges of the plates 18 and 19 confronting the side leaves 4 are cut away at 25 to allow for the foregoing arcuate motion, but also to allow for the free riding of the edges over the confront leaves when the jaws are separated. It is readily understood that in the separation of the jaws there will be a motion of the plates in respect to the side leaves, and inasmuch as the extent of motion is considerable between the edges of the plates and the leaves at points opposite to the fulcrums 23 the cut away portions 25 are nicely rounded to facilitate the relative riding.

In order that the milk bottle neck opening defined by the jaws may be as near a true circle as possible the outer edges of the plates 18 and 19 are cut in at 26. These cut in places are curved, and they match the general curvature of the jaws, particularly that of the flanges 13. It has been indicated that the pivots 6 are subject to some variation in practice. This is equally true of the pivots 20 and of a hinge pin 27 which is mentioned later. But according to the present showing, the pins 20 and 27 have heads appearing on top of the holding members. Now, in order that these upstanding heads may not interfere with the folding up of the holding members, the base plate has holes 28 and 29 at appropriate places to receive these heads, so that it will be possible to move the holding members directly against the base plate in which position they will be releasably locked by the tongue 9 as explained already.

The locking device by which all of the bottles of a series are secured by the holder when the last bottle of the series is inserted into the holding member having the locking device inserted therein is as follows: A latch 30 is pivoted upon the hinge pin 27 recently mentioned. The latch is confined by the side arms 16 and 17 of one of the holding members, and by the plates 19 of said side arm 17. It is known as an adaptable latch, and for the purpose of adapting itself to various diameters of milk bottle necks it is capable of both a swinging motion on the hinge pin 27 and a bodily sliding motion within its confines. The last motion is made possible by the provision of slots 31 in the plates 18 and notches 32 in the plates 19 (Figure 7).

These motions are intended to be resisted by a spring 33 which is suitably formed at 34 to receive the pivot pin 20 by which the spring is retained, and bent into the shape of a heel at 35 to bear against an adjoining flat side of the latch. The shape and disposition of the spring is such that it will move the hub 36 of the latch into engagement with an adjoining part of the jaw 10 of the holding member by which it is carried upon being released. The outer face of the latch is curved so as to conform to the general shape of the jaws.

A recess 37 in back of the latch defines a keeper 38 with which the point 39 of a bolt 40 is engageable when the point enters the recess. A housing 41 slidably contains the bolt. The latch carries a headed stud 42 which rides in a slot 43 in the housing. A spring 44, situated between the closed end of the housing and the back of the bolt, tends to keep the stud at the forward end of the slot and the bolt in the extended position. The stud and slot limit the movement of the bolt in one direction.

As long as the holding member 5 having the locking device is devoid of milk bottles the latch 30 will occupy the extended position in the associated jaws 10 and 11 as shown in Figures 1 and 2. At such a time the keeper 38 of the latch and the point 39 of the bolt are clear of each other, and it is perfectly easy to swing the jaws 10 and 11 open as, for instance, in thrusting the neck of the last milk bottle in. As soon as the neck of the milk bottle presses against the latch 30 the keeper 38 will be moved behind the point 39 so that relative swinging of the jaws will be prevented.

For these purposes the latch 30 must be carried by one of the jaws, and the bolt 40 by the other. The latch 30 is carried by the jaw 10 by virtue of the attachment of the hinge pin 27 in the slots 31 in the plates 18 of the side arm 16. It is to be observed that the notches 32 in the plates 19 of the other jaw open at the edges adjacent to the pin 27. The bolt 40 is carried by the jaw 11 by virtue of being confined in the housing 41 which is immovably incorporated between the plates 19 of the side arm 17.

It will be perceived at once that the degree of variation in the diameters of milk bottle necks in respect to which the locking device will be effective, depends upon the lengths of the keeper 38 and point 39. The smallest size bottle neck which the holder is capable of securing will swing the latch 30 on its pivot to bring the keeper 38 and point 39 into engagement, thus to lock the holder. Upon presentation of the largest size bottle neck the latch 30 will be bodily displaced or slid over, in which motion the bolt 40 is pushed back by the action of the latch. Obviously bottle necks of intermediate sizes will bring about a similar engagement of the keeper and point, and the relative positions of the latch and bolt will simply vary with the extent to which the latch has been pressed in.

Release of the latch 30 from the bolt 40 is accomplished by the ward 45 of a key 46 (Figure 11). The key ward is inserted in a hole 47 in the side arm 17. The pintle 48 of the key will fit in an opening 49 in the side of the housing 41 and thus complete a bearing for the key. The ward operates in a recess 50 in the bolt (Figures 2, 4 and 10). Upon turning the key to the right (looking at the holder in Figure 5) the ward 45 will retract the bolt 40 from the latch recess 37, and when the turn of the key is completed the extreme edge of the ward will enter a slight depression 51 (Figure 4) to temporarily hold the key in the turned position and the bolt in the retracted position against the tension of the spring 44.

The depth of the depression 51 is just enough to accomplish the purpose, and will not prevent the free turning of the key in the opposite direction for the purpose of removing it from the key hole 47. Of course, when the key is turned in the opposite direction the spring 44 will cause the bolt 40 to follow. A groove 52 on the underside of the bolt (Figure 10) provides for the occupancy of the pintle 48 and for the unrestricted movement of the bolt when operated by the ward. The pintle 48 extends across the housing 41 to its bearing point in the opening 49, and obviously must avoid restricting the bolt. The groove 52 provides for the passage of the pintle, and is of a length equal to the stroke of the bolt that is imparted by the ward 45.

Mention has been made of the connecting rod 8. A connecting bar 53 is also involved in the construction. The connecting rod joins all of the left jaws 10 in such a manner that they will work together, while the connecting bar 53 so joins all of the right jaws that they too will work together. However, the connections of the rod and bar are direct only in respect to the last holding member 5, namely, the one at the extreme right by which the locking device is carried.

Screws 54 and 55 secure the respective rod 8 and bar 53 to the jaws 10 and 11 of said last holding member. Although the connection at each point is firm yet it is sufficiently loose to compensate for the swinging movement of the jaws. The rod 8 has a pin 56, collar or a similar device to engage the side arm 16 of the second jaw 10, while the bar 53 has a lug 57 or the like to engage the side arm 17 of the second jaw 11.

The lug 57 has a hole receiving the rod 8, and it is thus that the bar 53 is partly supported by the rod. The lug 57 will ride upon the bar when milk bottles are inserted. The right extremity of the rod 8 is connected with the side arm of the jaw 10 of the last holding member, as indicated already, and it passes through holes in the side arms of the jaws of the remaining holding members, these holes being sufficiently large to allow for the swinging movement of the jaws of those members.

Figure 13 illustrates a modification in the latch. Inasmuch as so much of the structure shown is the same as that already described, such structure is merely identified by corresponding reference numerals. The latch 58 has a shank 59 which is slidable in a housing 60, similar to the housing 41 of the bolt 40. A stud 61 works in a slot 62 and limits the extension of the latch by virtue of a spring 63.

The latch 58 is in this instance capable of only sliding movement, the purpose of the modification being to show that the pivotal motion accomplished in Figure 2 is not necessarily adhered to, nor that the latch must necessarily operate both on pivotal and slidable movements. It will be perceived that the action of the latch 58 in Figure 13 is substantially the same as that in Figure 2. The interaction of the keeper 38 and point 39 will be the same.

Figure 14 illustrates a modification in which the holder comprises but a single holding member. This holding member will be identical in construction with the holding member at the right of Figures 1 and 2, with the exception that the connecting rod 8 and bar 53 are omitted, obviously so because no other holding members are involved in the construction. The base plate 2 is only large enough to serve the purpose of the single holding member.

Figures 15 and 16 illustrate a modification in which the plates 64 and 65 of the jaws 10 and 11 are made to abut instead of overlap as in the preceding form of the invention. The top plates show in Figures 15 and 16 as do also portions of the bottom plates. The latch will appear precisely the same as the top plates, and if one were to look into the holding member from a position inside of the jaws he would perceive a substantial rectangle which is largely occupied by the latch 30.

The side arms of the jaws, as well as the top and bottom plates, come within the confines of a keeper 66 when the jaws are closed. This keeper is bent into shape from a suitably formed metallic blank, and when bent into shape, presents top and bottom portions, seen in Figure 16, as well as side leaves 67 by which a pivot pin 68 is received. This pivot pins performs the same funtion as the pins 6 in Figures 1 and 2.

Pivots 69 pass through the keeper 66 from the top to bottom and hold the jaws in place. The edges of the top and bottom plates 64 and 65 adjoining the pivots 69 are rounded somewhat at 70 to allow for the swinging motion of the jaws when the side arms rock on the fulcrum edges 71 of the side leaves 67. In this instance the latch 30 is pivoted at 72 to the plates 64 of the jaw 10. The connection may be that of a simple pivot, or the holes of the plates 64 may be slightly elongated to form slots which would afford the latch some sliding movement as in the main form of the invention. It is preferred to consider the connection as being that of a simple pivot, thus to specifically illustrate another one of the various modes of mounting the latch. In its other respects the structure will be the same as that shown at the right of Figure 2, it being understood that the bolt 40 and the other appurtenances must be employed in order that the functions may be performed.

Attention is directed to Figure 17. This illustrates only one holding member, but all of the holding members of a holder of this particular type will be similarly constructed, yet this is not imperative because some of the holding members of such a holder may have single jaws and others double jaws as shown in Figure 17. The extra jaws are designated 73.

The extra jaws will comprise continuations of the original jaws 10 and 11. The purpose is to receive empty milk bottles. Such bottles will be thrust into holding position between the extra jaws. They will not be thrust far enough to take up positions between the original jaws. The idea is to permit the ready removal of the empty bottles without having to touch the locking device. If an empty bottle were thrust between the jaws 10 and 11 of the holding member to engage the locking device the entire series of empty bottles would be locked in place and the bottles could not be removed without the use of the key 46.

The operation is readily understood. Although the holder is herein described as being for the purpose of securing milk bottles it has been fully emphasized that a wide variety of other objects to be held may be secured. This capability does not depend upon either the size or shape of the object, although in many instances it would probably be necessary to re-shape the jaws to conform.

As many milk bottles can be secured as the capacity of the holder provides for. The holder in Figure 14 will secure only one bottle. The broken portions in Figures 1 and 2 indicate an extension of the holder to the left. The holding members are shown in Figures 1 and 2, but the base plate 2, rod 8 and bar 53 may be extended an indefinite distance to the left to take in as many additional holding members as may be desired.

It is sufficient to consider the two holding members shown. Milk bottle necks should be inserted in the holder from left to right, that is to say the first bottle should be inserted between the jaws of the first holding member at the left, and a second milk bottle should then be inserted in the jaws of the holding member at the right. This is the member that has the locking device incorporated therein, and the holding member that is the locking device should always be reserved to the last for filling. If this member were filled first, all of the remaining holding members would be locked, and could be unlocked only by using the key 46.

By providing the inturned flanges 13 the milkman is not required to be particularly careful in thrusting the bottles into position. The bottles will be held should they be presented at angles varying somewhat from the perpendicular, and would even be sustained at angles were it possible for the bottles to remain thereat.

A second and equally important purpose of the flanges 13 is to strengthen the jaws. This strengthening is accomplished in a rather peculiar way and especially at a particular point. In Figure 1 it is to be observed that the curve of the flanges continues around until the flanges merge with the uppermost plates 18 and 19. The structure is continuous, and particular strength is imparted at the points where the flanges and plates meet. It is at these points where most of the strength is required, and the structure adequately serves the purpose.

A bottle neck inserted in the first holding member at the left in Figure 2 would cause a separation of the jaws 10 and 11. The swinging movement would be transferred to the jaws 10 and 11 of the holding member at the right by virtue of the engagement of the side arms 16 and 17 with the pin 56 and lug 57. The sympathetic opening movement of the jaws proceeds only to the right as the holding members are filled. It does not trail at the left. For instance, if the capacity of the holder were four bottles, the insertion of a bottle in holding member #1 would be followed by a sympathetic opening of the jaws of holding members #s 2, 3 and 4. The insertion of a bottle in holding member #2 would result in a sympathetic opening of the jaws of members #s 3 and 4, but not of member #1. The same principle prevails when filling members #s 3 and 4.

The understanding will be complete by reverting to Figure 2. Suppose that the two holding members are #s 3 and 4 of the preceding illustration. We will regard #3 as being filled, and the fourth bottle to be inserted in the last holding member. As this bottle is pressed in, the jaws 10 and 11 will separate. The connecting rod 8 will slide freely to the left without interferring with holding member #3. The connecting bar 53 will similarly slide to the right. Thus the insertion of succeeding milk bottles will not operate to release previously inserted milk bottles. The milk bottles should be removed from the holder in order to reverse to that in which they were inserted. After unlocking the holding member at the right the milk bottle of that holding member should be removed first, the bottle of the holder at the left removed next and so on. The bottles will not drop out upon the unlocking of the holder because they will be retained by the flanges 13.

Although the adaptability of the latch 30 has been described in detail it is believed that the action may be emphasized. Figure 2 illustrates the normal extension of the latch. The same condition is illustrated in full lines in Figure 12. The keeper 38 and point 39 are normally disengaged so that the jaws 10 and 11 may swing open. Were the keeper and point in engagement this swinging would be prevented. Now consider the insertion of a small neck bottle. The amount of displacement of the latch would be sufficient to bring the keeper 38 and point 39 into engagement and thus prevent the opening of the jaws until the key is used. The latch would merely swing with the hinge pin 27 as a pivot.

Now consider the insertion of a large-neck bottle. The latch 30 would be displaced to the dotted line position in Figure 12. The hinge pin 27 has been moved to the opposite ends of the slots 31 to make room for the large size neck. The engagement of the keeper 38 with the point 39 is still maintained, but the displacement of the latch 30 caused pushing back on the bolt 40. The latch and bolt are adaptable to any intermediate sizes of bottle necks.

In using the key 46 in the manner previously described, the bolt 40 would be displaced from the keeper 38 of the latch so that the jaws 10 and 11 may be swung open. It is important to observe that the holder cannot be locked in the absence of milk bottles. It is imperative that a milk bottle be inserted in the last holding member before the holder will become locked. It cannot be locked by means of the key 46. Sometimes a child, perhaps even others who should know better, will insert the key in the hole 47 and play with the holder, but no amount of playing will serve to lock the device so that milk bottles could not be inserted when desired.

The turning of the key, upon unlocking the holder after it has been filled with bottles, will not serve to let the bottles drop. The springs 21 keep the jaws closed, and the holding function of the flanges 13 has been emphasized already. The bottles must be pulled out of the holder and, as previously stated, should be pulled out by working from right to left.

While the construction and arrangement of the improved holder is that of a generally modified form, obviously modifications and changes may be made without departing from the spirit of the invention or the scope of the claims.

I claim:—

1. A holder comprising a plurality of jaws, a lock bolt carried by one of the jaws, a latch carried by another one of the jaws, and means affording variations in the extent of the engagement of the latch with the bolt when an object to be held is inserted between the jaws, thus compensating for variations in the size of such object.

2. A holder comprising jaws of which one is movable so that the holder can receive an object to be held, and a locking device which is displaceable into any one of a variety of locking positions by any one of a variety of sizes of objects to be held when thrust between the jaws to lock the jaws against movement when assuming any one of said positions.

3. A holder comprising jaws of which one is movable so that the holder can receive an object to be held, and a locking device consisting of a latch which is movably carried by one of the jaws, and a bolt carried by another jaw with which the latch is engageable to a varied extent when an object to be held is inserted between the jaws, to prevent movement of the jaws during any degree of engagement of the latch with the bolt.

4. A holder comprising jaws of which one is movable, a bolt carried by one of the jaws, and a latch caused to engage the bolt by an object to be held when inserted between the jaws, said latch being pivotally and slidably displaceable to compensate for differences in the sizes of said object.

5. A holder comprising jaws of which one is movable, a bolt carried by one of the jaws, a latch carried by another jaw, means by which the latch is loosely mounted upon said jaw, and a spring tending to keep the latch in one position on its loose mounting, confining the latch to a pivotal movement for engaging the bolt when an object of one size is inserted in the jaws and permitting a slidable displacement of the latch to engage the bolt when an object of a larger size is inserted in the jaws.

6. A holder comprising jaws which are yieldable to receive an object to be held, a bolt carried by one of the jaws, a latch carried by the other jaw, means by which the latch is loosely mounted on the other jaw so that it can swing as on a pivot or slide to engage the bolt in either case when objects of appropriate sizes are inserted, and a spring mounted in the holder, capable of bodily flexure by the displacement of the latch, bent to terminate in a heel which bears against the latch, flexure of the spring occurring at the bend when the latch is confined to pivotal movements.

7. A holder comprising a plurality of holding members each having jaws, and means so connecting the jaws that the jaws of a succeeding holding member will be opened by the insertion of an object into one holding member, but that the jaws of said one holding member will be unaffected when an object is inserted in said succeeding holding member.

8. A holder comprising a plurality of holding members each having jaws, means so connecting the jaws that the jaws of a succeeding holding member will be opened by the insertion of an object into one holding member, but that the jaws of said one holding member will be unaffected when an object is inserted in said succeeding holding member, and a locking device associated with said succeeding holding member being operated by the insertion of the object thereinto to act from said connecting means to prevent the release of the objects from any of the holding members.

9. A holder comprising a plurality of holding members each with jaws, means commonly connecting certain jaws of the holding members, means commonly connecting the other jaws of the holding members, both of said connecting means causing a sympathetic yielding of the jaws of a succeeding holding member when an object to be held is inserted in one of the holding members, and a locking device associated with said succeeding holding member preventing the jaws of the succeeding holding member from yielding when an object is inserted thereinto and acting through said connecting means to prevent the yielding of the jaws of said one holding member.

10. A holder comprising a plurality of holding members having yieldably mounted jaws, and separate means so connecting certain jaws of the respective holding members in common that a sympathetic yielding of the jaws will occur only in one direction along the holder as the successive holding members are filled in that direction with objects to be held.

11. A holder comprising a plurality of holding members having yieldably mounted jaws, separate means so connecting certain jaws of the respective holding members in common that a sympathetic yielding of the jaws will occur only in one direction along the holder as the successive holding members are filled in that direction with objects to be held, and a locking device incorporated in the last of the succeeding holding members, preventing the yielding of all of the jaws when the last holding member is filled.

12. A holder comprising a plurality of holding members each having yieldably mounted jaws, a connecting rod and a connecting bar common to all of the holding members, means securing the rod to one of the jaws of one of the holding members, means to secure the bar to the other jaw of said holding member, means on the rod and bar so associated with the respective jaws of the next holding member that yielding of said jaws will shift the rod and bar but shifting of the rod and bar will not cause yielding of said jaws, and a locking device associated with one holding member for preventing shifting of either the bar or rod or yielding of any of the jaws when an object is inserted in said one holding member.

13. In a holder, a pair of jaws of which one is yieldable to receive an object to be held, and flanges extending inwardly from certain edges of the jaws to remove the point of support of said object from the sides of the jaws.

14. A holder comprising a base plate having side leaves, a pair of jaws having side arms and plates disposed between the leaves, a pivot carried by the leaves to which the side arms are loosely connected, and a pivot pin pivotally joining the plates, being stationed at a point close to the forward edges of the leaves so that said edges will act as fulcrums for the side arms when the jaws are swung upon said pivot pin.

15. A holder comprising a base plate having side leaves, a pair of jaws having side arms and plates disposed between the leaves, a pivot carried by the leaves to which the side arms are loosely connected, a pivot pin pivotally joining the plates, being stationed at a point close to the forward edges of the leaves so that said edges will act as fulcrums for the side arms when the jaws are swung upon said pivot pin, and resilient means assembled upon said first pivot, pressing against the side arms and extending to keep them in engagement with said leaves.

16. A holder comprising a pair of jaws each having side arms and top and bottom plates, a locking device situated within the closure defined by said plates and said arms, a keeper in which the plates are pivoted for opening and closing movements of the jaws, said keeper having side leaves and a pivot extended through the side leaves and side arms.

17. A holder comprising a pair of relatively movable side arms having confronting plates and being formed into a pair of jaws, and inturned flanges along one edge of each of the jaws extending to and merging with the confronting plates to reinforce and strengthen the juncture of the side arms with the jaws.

18. A holder comprising a holding member having relatively movable arms each with connected double jaws in confronting relationship.

THOMAS C. ROUSE.